United States Patent
Lennvall et al.

(10) Patent No.: US 9,451,468 B2
(45) Date of Patent: Sep. 20, 2016

(54) MULTI-NETWORK MANAGER, METHOD AND SYSTEM

(75) Inventors: Tomas Lennvall, Vasteras (SE); Tiberiu Seceleanu, Vasteras (SE)

(73) Assignee: ABB Research Ltd., Zurich (CH)

( * ) Notice: Subject to any disclaimer, the term of this patent is extended or adjusted under 35 U.S.C. 154(b) by 126 days.

(21) Appl. No.: 13/167,535

(22) Filed: Jun. 23, 2011

(65) Prior Publication Data

US 2011/0280226 A1 Nov. 17, 2011

Related U.S. Application Data

(63) Continuation of application No. PCT/EP2009/067845, filed on Dec. 23, 2009.

(30) Foreign Application Priority Data

Dec. 23, 2008 (EP) .................................. 08172743

(51) Int. Cl.
*H04W 72/04* (2009.01)
*H04W 16/14* (2009.01)
*H04W 72/12* (2009.01)

(52) U.S. Cl.
CPC ......... *H04W 16/14* (2013.01); *H04W 72/1231* (2013.01)

(58) Field of Classification Search
CPC ... H04W 84/18; H04W 28/08; H04W 24/04; H04W 72/1231; H04W 16/14; G06F 17/30867
USPC .......................... 370/310, 328, 329, 336, 337
See application file for complete search history.

(56) References Cited

U.S. PATENT DOCUMENTS

| | | | |
|---|---|---|---|
| 5,603,085 A * | 2/1997 | Shedlo .......................... | 455/450 |
| 5,809,423 A * | 9/1998 | Benveniste ................ | 455/452.2 |
| 6,788,702 B1 * | 9/2004 | Garcia-Luna-Aceves et al. ............................. | 370/458 |
| 6,928,061 B1 * | 8/2005 | Garcia-Luna-Aceves et al. ............................. | 370/329 |
| 6,996,078 B2 * | 2/2006 | Pan et al. ...................... | 370/329 |
| 7,702,817 B2 * | 4/2010 | Rodriguez .................... | 709/249 |
| 7,801,065 B2 * | 9/2010 | Simpson et al. .............. | 370/311 |
| 8,169,974 B2 * | 5/2012 | Pratt et al. .................... | 370/332 |

(Continued)

FOREIGN PATENT DOCUMENTS

CN 101154988 A 4/2008

OTHER PUBLICATIONS

European Search Report; Application No. EP 08 17 2743; May 20, 2009; 8 pages.

(Continued)

*Primary Examiner* — Chi H Pham
*Assistant Examiner* — Robert Lopata
(74) *Attorney, Agent, or Firm* — Whitmyer IP Group LLP

(57) ABSTRACT

A method for reducing interference between wireless networks for industrial devices. The method includes the steps of: obtaining a first resource schedule of a first wireless network manager; obtaining a second resource schedule of a second wireless network manager; determining whether there are resource conflicts between the first resource schedule and the second resource schedule; and providing, when at least one resource conflict is determined, a new wireless resource schedule for the first wireless network manager to avoid at least part of the determined resource conflicts. A corresponding multi-network manager, system and computer program product are also presented.

18 Claims, 4 Drawing Sheets

(56) References Cited

U.S. PATENT DOCUMENTS

| | | | |
|---|---|---|---|
| 8,218,493 B2* | 7/2012 | Mishra et al. | 370/329 |
| 8,284,715 B2* | 10/2012 | Jalil et al. | 370/328 |
| 8,325,661 B2* | 12/2012 | Montojo et al. | 370/329 |
| 8,356,431 B2* | 1/2013 | Pratt et al. | 37/337 |
| 8,406,248 B2* | 3/2013 | Pratt et al. | 370/444 |
| 8,412,246 B2* | 4/2013 | Gormley et al. | 455/509 |
| 8,498,253 B2* | 7/2013 | Krause et al. | 370/329 |
| 8,509,099 B2* | 8/2013 | Sengupta et al. | 370/252 |
| 8,559,359 B2* | 10/2013 | Lott et al. | 370/318 |
| 8,559,383 B2* | 10/2013 | Zetterman et al. | 370/329 |
| 8,693,330 B2* | 4/2014 | Lohmar et al. | 370/231 |
| 2002/0136233 A1 | 9/2002 | Chen et al. | |
| 2002/0173272 A1 | 11/2002 | Liang et al. | |
| 2005/0055426 A1* | 3/2005 | Smith et al. | 709/219 |
| 2005/0074529 A1* | 4/2005 | Cohen et al. | 426/106 |
| 2005/0076173 A1* | 4/2005 | Merril et al. | 711/100 |
| 2005/0076336 A1* | 4/2005 | Cutrell et al. | 718/100 |
| 2005/0076339 A1* | 4/2005 | Merril et al. | 718/104 |
| 2006/0094371 A1 | 5/2006 | Nguyen | |
| 2006/0099956 A1* | 5/2006 | Harada et al. | 455/452.2 |
| 2006/0205413 A1* | 9/2006 | Teague | 455/452.1 |
| 2007/0097867 A1* | 5/2007 | Kneckt et al. | 370/236 |
| 2007/0155431 A1* | 7/2007 | Munzner et al. | 455/560 |
| 2007/0291822 A1* | 12/2007 | Staley et al. | 375/132 |
| 2008/0232334 A1 | 9/2008 | Das et al. | |
| 2008/0253335 A1* | 10/2008 | Bosch et al. | 370/335 |
| 2008/0279137 A1* | 11/2008 | Pernu | H04W 88/06 370/328 |
| 2008/0279155 A1* | 11/2008 | Pratt et al. | 370/336 |
| 2009/0080375 A1* | 3/2009 | Jalil et al. | 370/329 |
| 2009/0245221 A1* | 10/2009 | Piipponen | 370/343 |
| 2010/0067448 A1* | 3/2010 | Chin et al. | 370/329 |
| 2010/0111021 A1* | 5/2010 | Hui | 370/329 |
| 2011/0013572 A1* | 1/2011 | Huang et al. | 370/329 |
| 2011/0044228 A1* | 2/2011 | Song et al. | 370/312 |
| 2011/0292895 A1* | 12/2011 | Wager et al. | 370/329 |
| 2012/0230303 A1* | 9/2012 | Guo et al. | 370/336 |

OTHER PUBLICATIONS

International Preliminary Report on Patentability ; PCT/EP2009/067845; Mar. 18, 2011; 11 pages.

International Search Report and Written Opinion of the International Searching Authority; PCT/EP2009/067845; Mar. 26, 2010; 15 pages.

Chen, et al.; "Modeling Channel Conflict Probabilities Between IEEE 802.15 based Wireless Personal Area Networks"; Jun. 1, 2006; IEEE; pp. 343-348.

The State Intellectual Property Office of the People's Republic of China Notification of 3rd Office Action Application No. 200980155587.0 Date: Jan. 27, 2015 pp. 8.

* cited by examiner

MULTI-NETWORK MANAGER, METHOD AND SYSTEM

CROSS-REFERENCE TO RELATED APPLICATIONS

The present application is a continuation of pending International Patent Application No. PCT/EP2009/067845 filed on Dec. 23, 2009 which designates the United States and claims priority from European Patent Application No. 08172743.0 filed on Dec. 23, 2008, the content of which is incorporated herein by reference.

FIELD OF THE INVENTION

The present invention relates generally to wireless networks, and more particularly to reducing a risk of interference between wireless networks.

BACKGROUND OF THE INVENTION

Wireless sensor networks are becoming more and more common in industrial plants. This naturally gives the advantage of communication from and/or to sensors, or other device, without the need for wires. Consequently, the networks are easier to deploy, maintain and eventually, de-commission.

However, when multiple wireless networks are used, interference between networks may cause problems. This interference may result in packets not being received properly, which may require re-transmission of any packets which have been subject to interference. This will delay the communication and will also use more energy, which is particularly problematic when the sensors are battery powered, which is frequently the case with industrial wireless sensor networks.

The United States patent application with publication number US2006/0094371 describes automatic channel selection in a wireless access point. An automatic channel selection (ACS) process enables an access point to determine a best channel available, i.e., the channel with a least amount of interference, for its operation. When ACS is enabled, the access point scans frequencies for all neighboring access points and their signal strengths. Based on this data, the access point then determines which frequency is least likely to be interfered with by these other access points. The access point switches itself to this frequency and begins operation. This rudimentary approach may work in situation where only the aspect of frequency is used to separate channels. However, the automatic channel selection described can not be used for situations where the same frequency is used across several access points.

US-2002/136233 presents a system and methods for coordinating transmissions in a wireless network wherein a plurality of frequency-overlapping protocols are used to exchange information between devices. In this system, a coordination point device integrates a monitoring functionality to identify impending data collisions between the frequency-overlapping protocols. The coordination point device further identifies quality of service parameters to determine if the protocols are operating within desirable ranges. Moderation one or more of the protocols is then performed to avoid data collisions arising from overlapping transmissions between the protocols while maintaining data throughput within acceptable ranges.

US 2002/173272 presents a device and various network configurations for monitoring, moderating, and/or coordinating wireless transmission traffic in a wireless communication network where overlapping communication frequencies coexist to significantly reduce or avoid interference caused by signal collisions.

SUMMARY OF THE INVENTION

An object of the present invention is to reduce interference between wireless networks for industrial devices.

In a first aspect of the invention, it is presented a method for reducing interference between wireless networks for industrial devices. The method comprises the steps of: obtaining a first resource schedule of a first wireless network manager; obtaining a second resource schedule of a second wireless network manager; determining whether there are resource conflicts between the first resource schedule and the second resource schedule; and providing, when at least one resource conflict is determined, a new wireless resource schedule for the first wireless network manager to avoid at least part of the determined resource conflicts.

It is thus provided a way to reduce conflicts between neighbouring wireless networks.

The step of determining whether there are resource conflicts may involve determining that the first resource schedule and the second resource schedule assign a use of the same frequency band at the same time.

The step of determining whether there are resource conflicts may involve determining conflicting time slot usage between the first resource schedule and the second resource schedule.

The step of providing a new wireless resource schedule may involve providing a new time slot schedule for at least one channel of the first wireless network manager.

The step of determining whether there are resource conflicts may involve determining a future resource assignment of the first resource schedule or the second resource schedule using a seed for a frequency hopping scheme.

The step of providing a new wireless resource schedule may involve providing a new seed for at least one channel of the first wireless network manager.

The method may be performed in conjunction with deployment of the first wireless network manager or the second wireless network manager.

The method may be performed periodically.

The method according to any one of the preceding claims, wherein the method is performed in a multi-network manager.

The step of determining whether there are resource conflicts optionally only considers devices belonging to one network, of the first network and second network, being within range the other network, of the first network and second network.

A second aspect is a multi-network manager for reducing interference between wireless networks for industrial devices. The multi-network manager comprises: means for obtaining a first resource schedule of a first wireless network manager; means for obtaining a second resource schedule of a second wireless network manager; means for determining whether there are resource conflicts between the first resource schedule and the second resource schedule; and means for providing, when at least one resource conflict is determined, a new wireless resource schedule for the first wireless network manager to avoid at least part of the determined resource conflicts.

The multi-network manager may be distinct from the first wireless network manager and the second wireless network manager.

A third aspect is a system for reducing interference between wireless networks for industrial devices comprising: the multi-network manager according to claim 10; a first wireless network manager; and a second wireless network manager.

The system may further comprise a third wireless network manager.

A fourth aspect is a computer program product loadable into the internal memory of a multi-network network manager, arranged to perform the method according to the first aspect, when the product is executed in the multi-network manager.

It is to be noted that any feature of the first, second, third, and/or fourth aspects may, where appropriate, be applied to any other aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The present invention will now be described more fully hereinafter with reference to the accompanying drawings, in which certain embodiments of the invention are shown.

This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
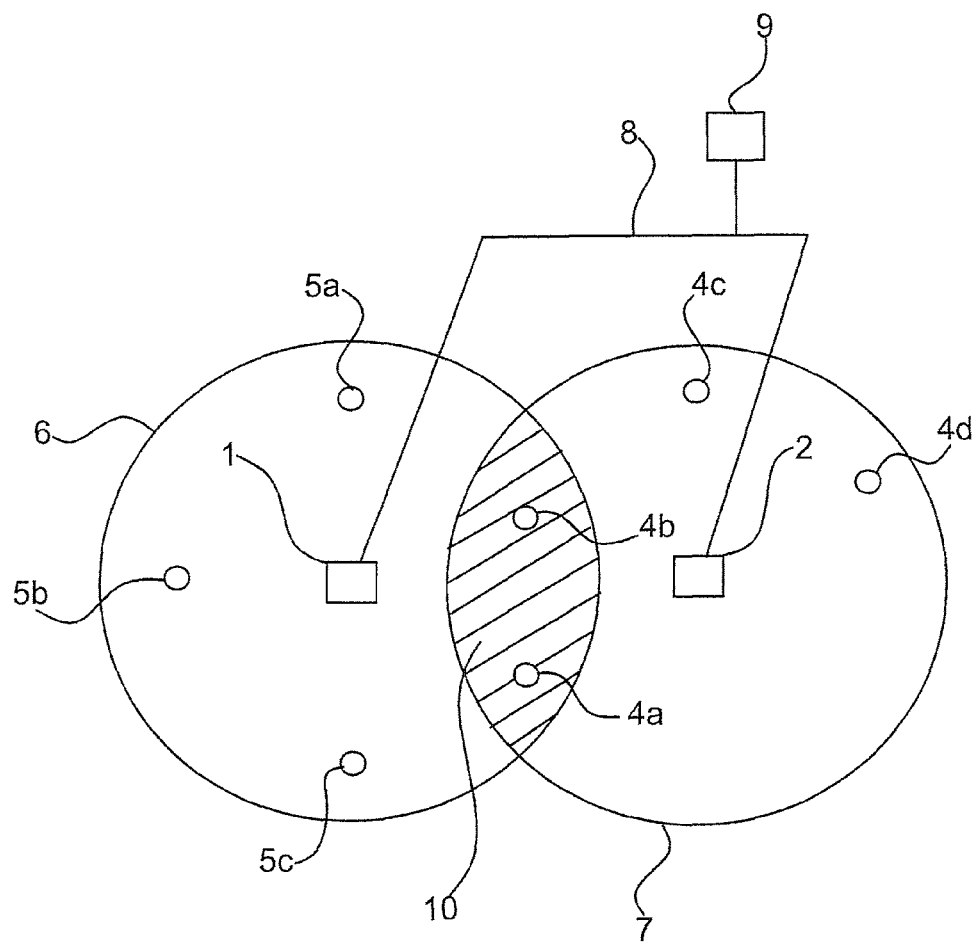
FIG. 1 is a schematic diagram illustrating an environment where the present invention can be embodied.

FIG. 1 is a schematic diagram illustrating an environment where the present invention can be embodied.

In the situation, schematically depicted as a top view of network topology for the two networks 6 and 7, there is a first wireless network manager 1 and a second wireless network manager 2, respectively. The first network manager, being responsible for a first network 6, enabling communication for devices 5a-c of the first network. A second network manager 2 is already deployed and is in an operating state, responsible for network 7. There is a geographical overlap between the two networks 1 and 2, indicated by the dashed area 10.

The wireless networks 6, 7 are any wireless networks being suitable for use in an industrial environment. For example, the wireless networks 6,7 can conform to wireless sensor networks according to the IEEE 802.15.4 standard, such as WirelessHART or ISAIOO, or other standards such as Bluetooth®. It is to be noted that even if frequency hopping can be used in the network to reduce the risk of interference, in the embodiments shown herein, the risk for interference is reduced even further.

The second network manager 2 enables communication for any of the devices 4a-4d within its network 7.

When the first wireless network manager 1 is to be deployed, there is potential interference in the overlapping area 10. As the skilled person will realise, this is a simplification of reality where there the ranges of the networks 6, 7 are not as definitively defined. Nevertheless, such a simplification makes the explanation of the embodiment clearer, and the loss of this detail is no great loss in this context.

A multi-network manager 9 is connected to a connection 8, allowing the multi-network manager 9 to communicate with the first wireless network manager 1 and the second wireless network manager 2. The connection 8 can be any suitable wire based or wireless communication, such as Ethernet, wireless network e.g. IEEE 802.11a/b/g/n or the same communication technology used for the wireless networks 6,7, universal serial bus (USB), etc. This multi-network manager 9 is responsible for detecting conflicts between schedules within its area of responsibility. The multi-network manager 9 can for example be a general purpose computer (e.g. a personal computer, PC), a server, or a custom made product. The only requirements on the multi-network manager 9 for this purpose is that it is connected to the connection 8 and that it can provide time slot schedules when requested. Alternatively, the multi-network manager 9 is connected with individual connections to the first wireless network manager 1 and the second wireless network manager.

The multi-network manager 9 can for example be responsible for reducing conflicts between wireless network managers of a building or a plurality of buildings within a plant or factory.

In this example, there are two devices 4a, 4b of the second wireless network 7 in the overlapping area 10. Since these devices 4a-b are in range of the first wireless network manager 1, the first wireless network manager 1 can listen to any communication between the devices 4a, 4b and the second wireless network manager 2. The first wireless network manager 1 can in this way obtain information about the second network 7, and, in case it is useful e.g. for identifying devices within the overlapping area 10, forward this information to the multi-network manager 9. In the case that the network is an IEEE 802.15.4 network, such as WirelessHART, the header of each data link layer (DLL) packet contains a network identifier. Hence, the first wireless network manager 1 can obtain the identity of the second wireless network 7 by scanning for DLL packets. Moreover, addresses of the devices 4a, 4b are also obtainable by listening to the DLL packets. The addresses can be used to identify the devices 4a, 4b, e.g. to identify time slots or seeds for frequency hopping used by these devices 4a, 4b in the scenario described in conjunction with FIGS. 2a-b and FIGS. 4a-b below.

If the multi-network manager 9 is informed of a potential conflict, e.g. by the first wireless network manager 1, the multi-network manager 9 can commence conflict resolution. Optionally, the multi-network manager 9 commences conflict resolution when a new wireless network manager is to be deployed. Furthermore, the multi-network manager 9 can periodically perform the conflict resolution. Any combination of the triggers mentioned above or any other suitable trigger can be used.

To perform the conflict resolution, the multi-network manager 9 obtains resource schedules for the two networks 6, 7, e.g. from the two wireless network managers 1, 2.

With the two resource schedules available, the multi-network manager 9 determines if there are conflicts between the two resource schedules, as exemplified in more detail below.

If there are any conflicts found, the multi-network manager 9 generates or modifies one of the two resource schedules where conflicts are at least partly avoided, and provides the new schedule to the appropriate wireless network manager 1, 2. Optionally, both wireless network managers 1, 2 are provided with new resource schedules.

Figure 2A:
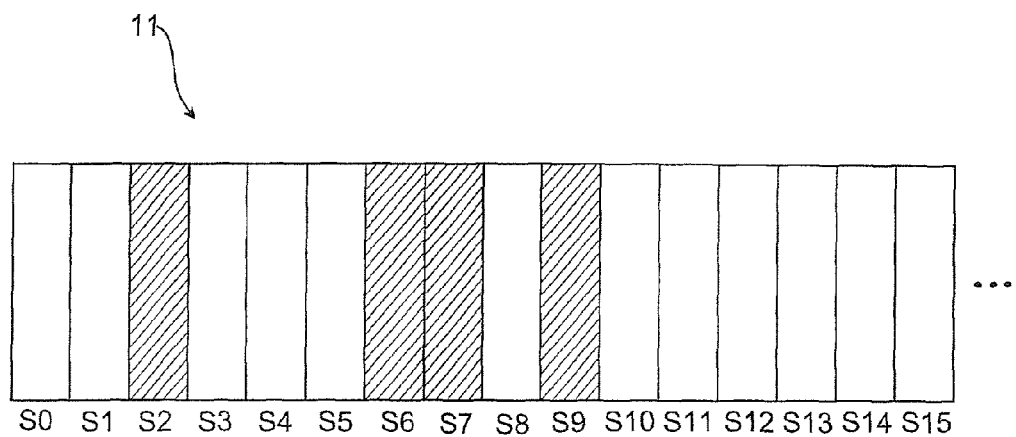
FIG. 2a is a schematic diagram of a second time slot schedule of the second wireless network manager of FIG. 1.

FIG. 2a is a schematic diagram of a resource schedule being a second time slot schedule 11 of the second wireless network manager 2 of FIG. 1.

As is known in the art per se, a time slot schedule can be used when Time Division Multiple Access (TDMA) is at least part of the solution for multiplexing a plurality of channels. TDMA allows a band of a particular frequency range to be divided into channels by assigning time slots for each such channel. In this example, the second time slot schedule 11, corresponding to one frame, is divided into sixteen time slots s0-s15. Four slots s2, s6, s7, s9 have been assigned in this particular case, allowing separate channels for each of the devices 4a-d of the second wireless network of FIG. 1.

Figure 2B:
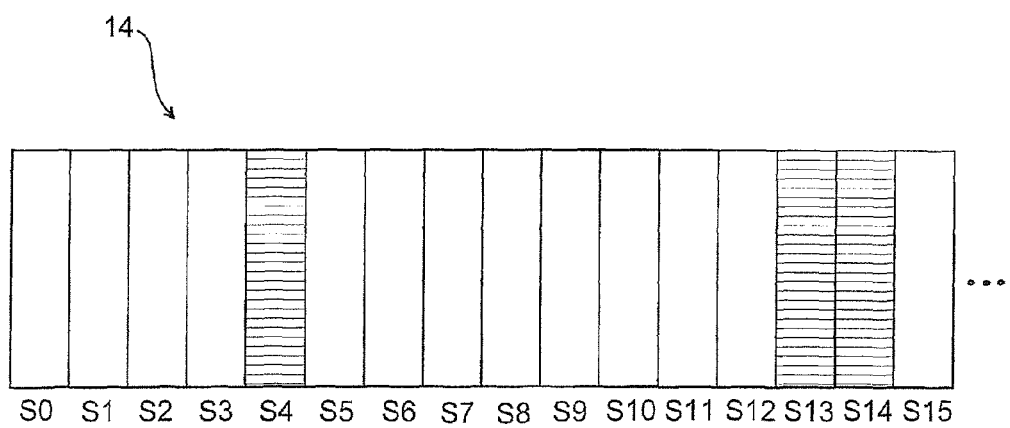
FIG. 2b is a schematic diagram of a first time slot schedule of the first wireless network manager of FIG. 1.

FIG. 2b is a schematic diagram of a first time slot schedule 14 of the first wireless network manager 1 of FIG. 1. This first time slot schedule 14 is generated by the multi-network manager 9 using the second time slot schedule 11 as an input. Hence time slots s2, s6, s7, s9 can be avoided to reduce the risk for interference. In this example, the first time slot schedule 14 assigns slots s4, s13 and s14 for the devices 5a-c of the first network 6.

Optionally, during the generation it is attempted to avoid to assign first time slots directly adjacent to assigned time slots of the second time slot schedule 11. Hence, in this case, time slots s1-s3 and s5-s10 are avoided. This can reduce the interference, particularly if the first wireless network manager 1 and the second wireless network manager 2 are synchronized. A guard time slot is thus provided between the two networks 6, 7, reducing the risk for interference even further.

Furthermore, optionally only the time slots of the second time slot schedule 11 corresponding to the devices 4a-b of the overlapping area 10 are avoided. So for example, if the device 4a is assigned time slot s2 and the device 4b is assigned time slot s6, only time slots s2 and s6 (or if guard time slots are used, s1-s3 and s5-s7) are avoided. This allows for more efficient use of the available wireless resources. Since, for example, communication between the second wireless network manager 2 and the device 4d will not interfere with the first network 6, the time slot associated with this communication can be re-used.

It is to be noted that the number of time slots, sixteen in this case, is just an example. The present invention can be embodied where any number of suitable time slots are used.

Figure 3:
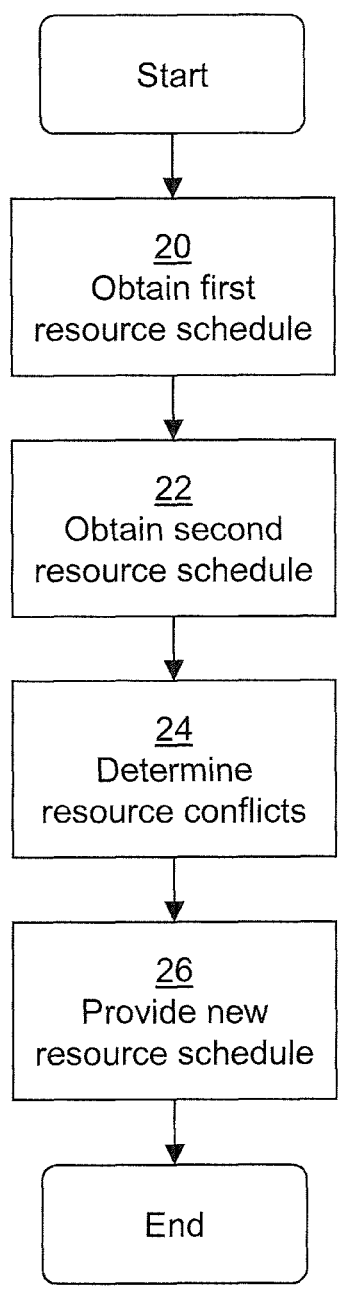
FIG. 3 is a flow chart illustrating a method of obtaining a time slot schedule for a wireless network manager, such as the first wireless network manager of FIG. 1, and FIGS. 4a-b are schematic diagrams of conflicting resource schedules of wireless network managers of FIG. 1.

FIG. 3 is a flow chart illustrating a method for reducing interference between wireless networks, such as the wireless networks 6,7 of FIG. 1.

In the obtain a first resource schedule step 20, the multi-network manager 9 obtains a first resource schedule, e.g. related to the first network 6. The resource schedule can for example be a time slot schedule or frequency hopping information for the channels of the network, or a combination of both. The schedule can be obtained e.g. directly from the first wireless network manager 1 or from storage, such as RAM (random access memory), magnetic storage, optical storage or any combination of these.

In the obtain a second resource schedule step 22, the multi-network manager 9 obtains a second resource schedule, e.g. related to the second network. The second resource schedule is typically of the same type as the first resource schedule.

In the determine resource conflicts step 24, the multi-network manager 9 determines if there are conflicts between the two resource schedules. This can for example be performed as explained in relation to FIGS. 2a-b or FIGS. 4a-b.

In the provide new resource schedule step 26, a new resource schedule is generated and provided to one or both of the wireless network managers 1, 2. Any detected conflicts are at least partly avoided when the new schedule (s) are generated.

The method just described can be implemented as embodied in computer code, to be loaded in internal memory of multi-network manager 9, to be executed in a controller in the multi-network manager 9.

Figure 4A:
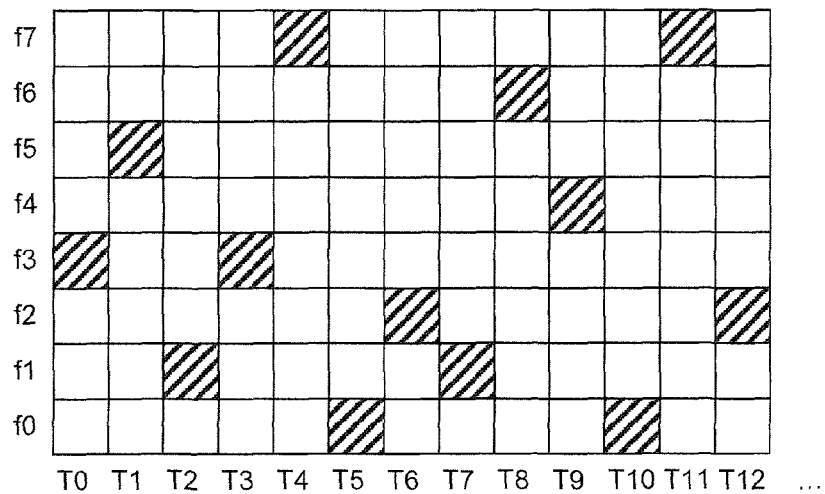
Figure 4B:
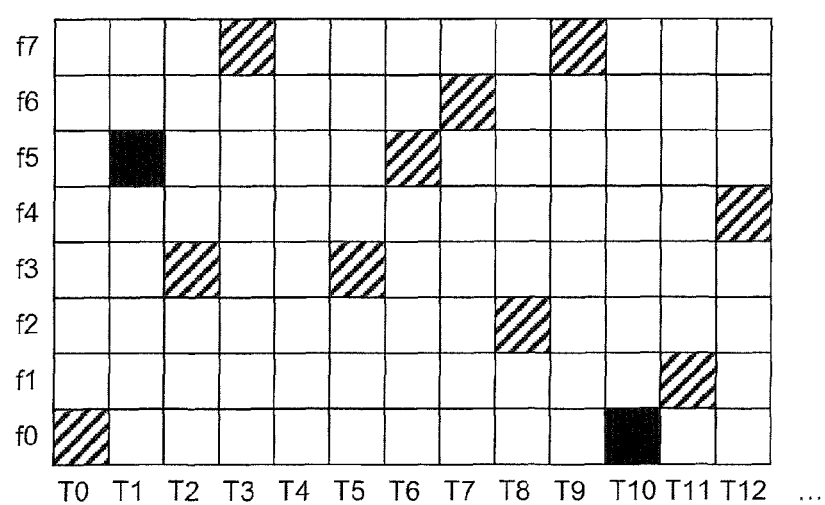

FIGS. 4A-B are schematic diagrams of conflicting resource schedules of wireless network managers of FIG. 1. FIG. 4A illustrates a resource schedule of a device in the first network 6 and FIG. 4A illustrates a resource schedule of a device in the second network 6.

FIG. 4A illustrates a first resource schedule where frequency hopping is used. Here, the resource usage of one channel is illustrated, i.e. between one of the devices and the first wireless network manager 1.

The vertical axis represents frequency and the horizontal axis represents time. So, for example, in time T0, frequency f3 is assigned for this channel. In time T1, f5 is assigned, in time T2, frequency f1 is assigned etc. The next frequency in the hopping is assigned according to schemes that are known in the art per se, e.g. using a seed for an algorithm where a different seed generates a different sequence.

FIG. 4B illustrates a second resource schedule where frequency hopping is used. Here, the resource usage of another channel is illustrated, i.e. between one of the devices and the second wireless network manager 2. The matrix in FIG. 4B illustrates in a way analogous to FIG. 4A, how frequencies are assigned over time to the channel.

As can be seen, both channels use frequency f5 in time T1 and frequency f0 in time T10. The multi-network manager 9 detects this e.g. by knowing the seeds for the two channels and the absolute time for the two wireless network managers 1, 2. In this way, the multi-network manager 9 can calculate the frequency hopping over time and, together with knowledge or assumption that the channels overlap geographically, detect or predict any conflicts. This allows the multi-network manager 9 to obtain the complete resource schedule for all channels of the two wireless networks 6, 7. Optionally, the conflicts can be determined for only a predetermined amount of time.

Once the conflicting points have been found, the multi-network manager 9 generates a new resource schedule, e.g. by giving a new seed to one or more channels for one or both of the first and the second wireless networks 6, 7.

The frequency hopping as described here can be combined with the time slots as described in relation to FIGS. 2a-b.

Although the invention has herein been described in a context of two networks, it is to be noted that the invention can be used in any number of networks, as long as there are at least two networks. The multi-network manager 9 would then perform in the way described above in relation to the two wireless network managers 1, 2, only combined with a third or more wireless network managers.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for reducing interference between at least two wireless networks for industrial devices, comprising the steps of:
   providing a centralized architecture comprising a multi-network manager that is configured to establish resource allocations and assignments in at least one of the at least two wireless networks;
   obtaining by the multi-network manager a first resource schedule of a first wireless network from a first manager of the first wireless network;
   obtaining by the multi-network manager a second resource schedule of a second wireless network from a second manager of the second wireless network;
   determining by the multi-network manager whether there are resource conflicts between said first resource schedule from said first manager and said second resource schedule from said second manager; and
   generating via the multi-network manager, when at least one resource conflict is determined, a new wireless resource schedule which assigns resources to industrial devices in the first wireless network, and transmitting said new wireless resource schedule to said first manager of the first wireless network, wherein said first manager implements the new wireless resource schedule into the first wireless network to avoid at least part of said determined resource conflicts;
   wherein said first and second resource schedules and said new wireless resource schedule are time slot schedules or frequency hopping information for channels of the respective wireless network or a combination of both.

2. The method according to claim 1, wherein said step of determining whether there are resource conflicts involves determining that said first resource schedule and said second resource schedule assign a use of a same frequency band at a same time.

3. The method according to claim 1, wherein said step of determining whether there are resource conflicts involves determining conflicting time slot usage between said first resource schedule and said second resource schedule.

4. The method according to claim 3, wherein said step of generating and transmitting a new wireless resource schedule involves providing a new time slot schedule for at least one channel of said first wireless network manager.

5. The method according to claim 1, wherein said step of determining whether there are resource conflicts involves determining a future resource assignment of said first resource schedule or said second resource schedule using a seed for a frequency hopping scheme.

6. The method according to claim 5, wherein said step of generating and transmitting a new wireless resource schedule involves providing a new seed for at least one channel of said first wireless network manager.

7. The method according to claim 1, wherein said method is performed in conjunction with deployment of said first wireless network manager or said second wireless network manager.

8. The method according to claim 1, wherein said method is performed periodically.

9. The method according to claim 1, wherein said step of determining whether there are resource conflicts only considers devices belonging to one network, of said first network and second network, being within range of the other network, of said first network and second network.

10. A multi-network manager for reducing interference between wireless networks for industrial devices, comprising:
    means for obtaining a first resource schedule of a first wireless network from a first manager of the first wireless network;
    means for obtaining a second resource schedule of a second wireless network from a second manager of a second wireless network;
    means for determining whether there are resource conflicts between said first resource schedule from said first manager and said second resource schedule from said second manager; and
    means for generating, when at least one resource conflict is determined, a new wireless resource schedule which assigns resources to industrial devices in the first wireless network, and for transmitting said new wireless resource schedule to said first manager of the first wireless network, wherein the new wireless resource schedule is to be implemented by said first manager into the first wireless network to avoid at least part of said determined resource conflicts;
    wherein said multi-network manager forms a centralized architecture with said first and second wireless networks and is configured to establish resource allocations and assignments in at least one of the first and second wireless networks;
    wherein said first and second resource schedules and said new wireless resource schedule are time slot schedules or frequency hopping information for channels of the respective wireless network or a combination of both.

11. The multi-network manager according to claim 10, wherein said multi-network manager is distinct from said first wireless network manager and said second wireless network manager.

12. A system for reducing interference between wireless sensor networks for industrial devices comprising:
    a first manager of a first wireless sensor network, said first manager providing communication for a first group of industrial devices;
    a second manager of a second wireless sensor network said second manager providing communication for a second group of industrial devices; and
    multi-network manager having
        means for obtaining a first resource schedule of the first wireless sensor network from said first manager of the first wireless sensor network,
        means for obtaining a second resource schedule of the second wireless sensor network from said second manager of the second wireless sensor network,
        means for determining whether there are resource conflicts between said first resource schedule from said first manager and said second resource schedule from said second manager, and means for generating, when at least one resource conflict is determined, a new wireless resource schedule which assigns resources to the first group of industrial devices, and for transmitting said new wireless resource schedule to said first manager of the first wireless sensor network, wherein the new wireless resource schedule is to be implemented by said first manager into the first wireless sensor network to avoid at least part of said determined resource conflicts;

wherein said multi-network manager forms a centralized architecture with said first and second wireless sensor networks and is configured to establish resource allocations and assignments in at least one of the first and second wireless sensor networks;

wherein said multi-network manager, in generating the new wireless resource schedule, maintains the first group of industrial devices associated with said first manager and the second group of industrial devices associated with said second manager.

13. The system according to claim 12, further comprising a third wireless network manager.

14. A computer program product stored on an internal non-transitory memory of a multi-network network manager, arranged to perform, when said product is executed in said multi-network manager, the steps of:
providing a centralized architecture between said multi-network manager and at least two wireless networks, said multi-network manager being configured to establish resource allocations and assignments in at least one of the at least two wireless networks;

obtaining by the multi-network manager a first resource schedule of a first wireless network from a first manager of the first wireless network;

obtaining by the multi-network manager a second resource schedule of a second wireless network from a second manager of the second wireless network;

determining by the multi-network manager whether there are resource conflicts between said first resource schedule from said first manager and said second resource schedule from said second manager; and generating via the multi-network manager, when at least one resource conflict is determined, a new wireless resource schedule which assigns resources to industrial devices in the first wireless network, and transmitting said new wireless resource schedule to said first manager of the first wireless network, wherein the new wireless resource schedule is to be implemented by said first manager into the first wireless network to avoid at least part of said determined resource conflicts;

wherein said first and second resource schedules and said new wireless resource schedule are time slot schedules or frequency hopping information for channels of the respective wireless network or a combination of both.

15. The method according to claim 1, wherein said first and second wireless networks conform to IEEE 802.15.4 standard.

16. The method according to claim 1, wherein said first and second wireless networks conform to WirelessHART standard.

17. The method according to claim 1, wherein said first and second wireless networks conform to ISA 100 standard.

18. The method according to claim 1, wherein said first and second wireless networks conform to Bluetooth standard.

* * * * *